United States Patent [19]

Linck

[11] 3,873,233

[45] Mar. 25, 1975

[54] DOUBLE SLOTTED CIRCULATION CONTROL AIRFOIL

[75] Inventor: Drew W. Linck, Gaithersburg, Md.

[73] Assignee: The United States of America as represented by the Secretary of the Navy, Washington, D.C.

[22] Filed: Feb. 19, 1974

[21] Appl. No.: 449,573

[52] U.S. Cl. ............. 416/90 A, 416/20, 244/42 CC
[51] Int. Cl. ............................................. B64c 21/08
[58] Field of Search ......... 244/42 CC, 42 CD, 42 C, 244/42 CA, 42 CB, 42 CE, 42 CF; 239/562; 416/20, 90 R, 90 A, 23

[56] References Cited
UNITED STATES PATENTS

| | | | |
|---|---|---|---|
| 2,135,887 | 11/1938 | Fairey | 416/23 |
| 2,406,917 | 9/1946 | Stalker | 244/42 CC |
| 2,617,487 | 11/1952 | Stalker | 416/20 |
| 2,885,160 | 5/1959 | Griswold | 244/42 CD |
| 3,525,577 | 8/1970 | Cheeseman | 416/90 A |
| 3,554,664 | 1/1971 | Cheeseman et al. | 416/90 A |

Primary Examiner—Trygve M. Blix
Assistant Examiner—Galen L. Barefoot
Attorney, Agent, or Firm—R. S. Sciascia; Q. E. Hodges

[57] ABSTRACT

A circulation control airfoil includes at least two slot blades supported by a rib structure positioned in the airfoil trailing or leading edge. The rib structure is attached to a main spar, to the airfoil trailing edge (or leading edge) and to the slot blades thereby maintaining the blowing jet slot heights and the geometric integrity of the trailing (or leading) edge of the airfoil.

4 Claims, 6 Drawing Figures

DOUBLE SLOTTED CIRCULATION CONTROL AIRFOIL

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

Circulation control airfoils utilize jets of air blown tangentially to the upper surface of the trailing edge of the airfoil to generate high lift coefficients. Generally, the chordwise position of the slot is determined prior to construction so as to inject the jet at the most beneficial chordwise position. The chordwise position is determined by calculating theoretical pressure distributions for the angles of attack and lift coefficients the airfoil is expected to experience. The jet should be located prior to the aft pressure peak so as to maintain airflow attachment on the airfoil. By increasing the circulation about the airfoil, high lift coefficients can be achieved. Prior art designs for circulation control airfoils, as disclosed in U.S. Pat Nos. 3,016,213 and 2,946,540, utilize single blowing slots for circulation control. U.S. Pat. Nos. 3,246,335 and 3,361,386 disclose multi-slotted airfoils but are designed for boundary layer control as opposed to circulation control.

SUMMARY OF THE INVENTION

As the thickness of an airfoil increases, the aft suction peak for increased lift coefficients moves forward. Separation occurs at lower angles of attack. In order to use circulation control effectively at high angles of attack, two or more blowing jet slots may be required to prevent separation. This invention provides a way to build a circulation control airfoil with two or more jet slots.

STATEMENT OF THE OBJECTS OF THE INVENTION

A primary object of the invention is to provide a multislotted circulation control airfoil.

Another object of the invention is to provide a novel support structure for a multislotted circulation control airfoil.

Other objects, advantages, and novel features of the invention will become apparent from the following detailed description of the invention when considered in conjunction with the accompanying drawings wherein:

DESCRIPTION OF THE PREFERRED EMBODIMENTS

Figure 1:
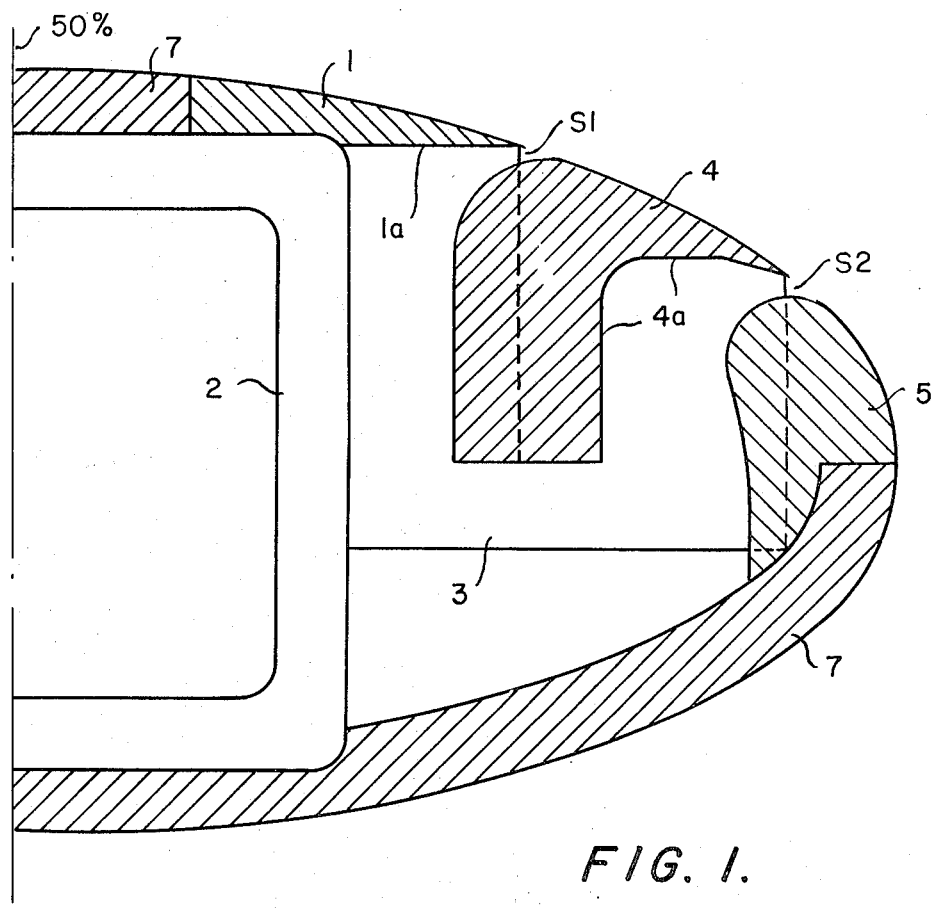
FIG. 1 is a partial cross-section of the multislotted circulation control airfoil of the present invention.
Figure 2:
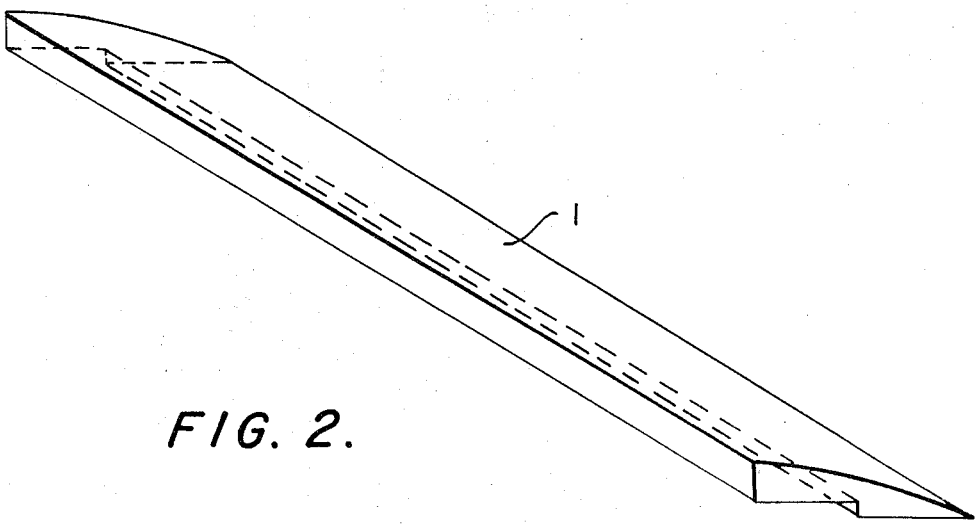
FIG. 2 is a perspective detailed view of the upper slot blade of the present invention.

A cross-section of the trailing half of the multislotted circulation control airfoil of the present invention is shown in FIG. 1. Spar member 2 which is of a rectangular cross-section, extends along the span of the airfoil and serves as the primary structural support member. Upper slot blade 1, which is shown in detail in FIG. 2, is attached to the main spar 2. Support rib 3 is attached to the main spar 2, to the trailing edge 5 of the airfoil, to the riding slot blade 4, and to the upper slot blade 1. Rib 3 follows the contour 4a of the back and under surface of the riding slot blade 4, extends through a slot in the riding slot blade 4 and then follows the contour 1a of the under surface of the upper slot blade 1. The first blowing jet slot S1 is thus formed by the upper slot blade 1 and the coanda surface provided by the riding slot blade 4. The second blowing slot S2 is formed by the riding slot blade 4 and the coanda surface 5 at the airfoil trailing edge. Coanda surface 5 is formed on the airfoil skin 7 by known means and may be grooved to provide for insertion of rib 3. Ribs 3 are spaced judiciously along the span of the airfoil depending on the structural needs.

Figure 3:
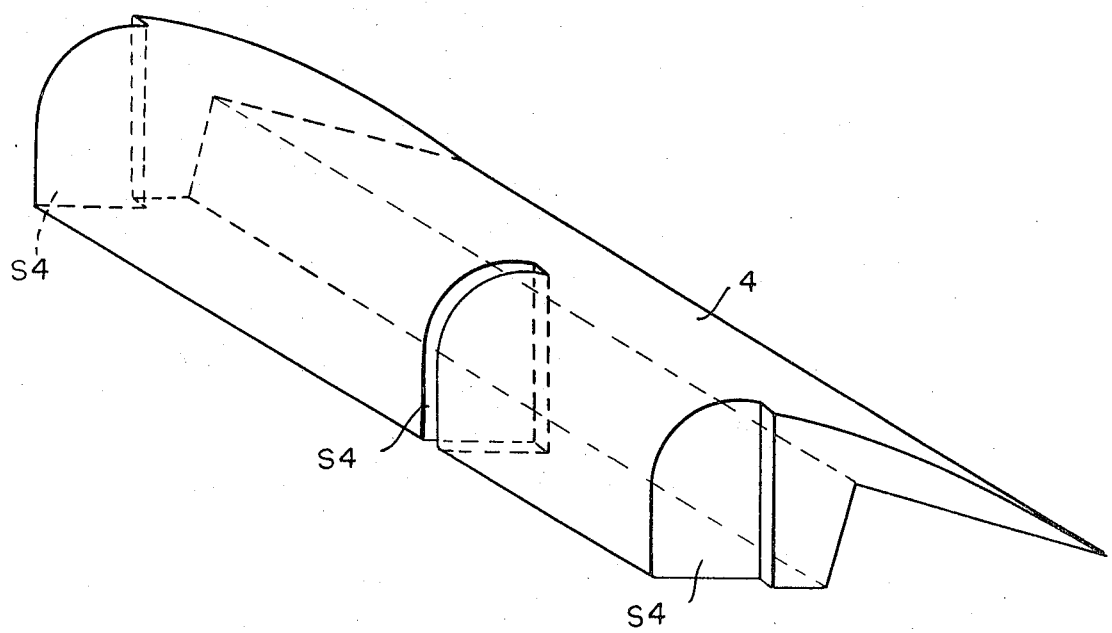
FIG. 3 is a perspective detailed view of the riding slot blade of the present invention.
Figure 4:
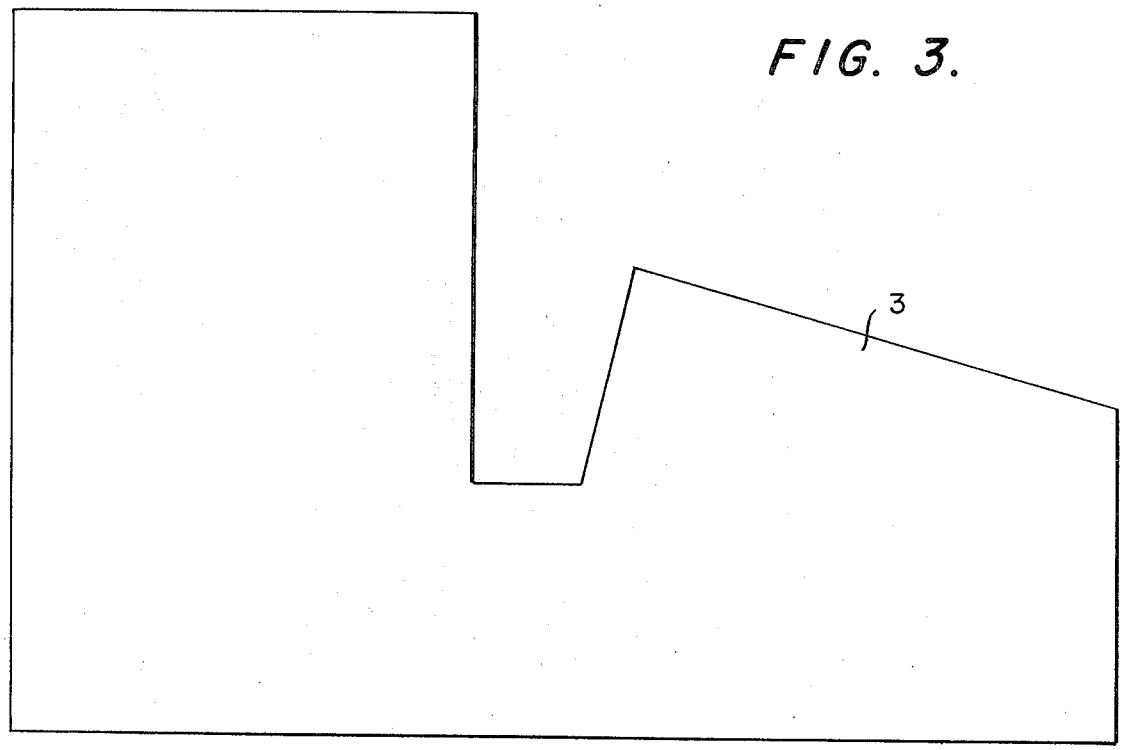
FIG. 4 is a detailed cross-section of the support rib structure designed for utilization with the riding slot blade shown in FIG. 3.

FIG. 3, which is a detailed perspective of the riding slot blade 4, shows how the slot blade 4 is provided with grooves S4 which are designed to permit insertion of ribs 3. FIG. 4 shows the cross-section of a rib support which is designed specifically for use with the riding slot blade shown in FIG. 3.

Thus, it is seen that rib structure 3, by its attachment to spar 2, upper slot blade 1, riding slot blade 4, and trailing edge of the airfoil not only maintains the slot height of each of the blowing slots but also maintains the geometric rigidity of the trailing edge of the airfoil.

Circulation control blowing is accomplished by pressurizing the interior of the airfoil section and blowing the fluid out jet slots tangentially to the airfoil and over a rounded coanda surface. The spar 2 would normally be vented to the trailing edge rib area to allow for more area (thus lower duct velocity) for the pressurized air to flow. The air would pass from the spar into the trailing edge and out through the blowing jet slots S1 and S2 formed by 1 and 4. The jet emitting from S1 at the forward chordlength location causes the airflow to remain attached to the airfoil until it reaches the second blowing slot S2 where the energy of the jet S2 continues to increase the airfoil's circulation and raises its lift coefficient.

Figure 5:
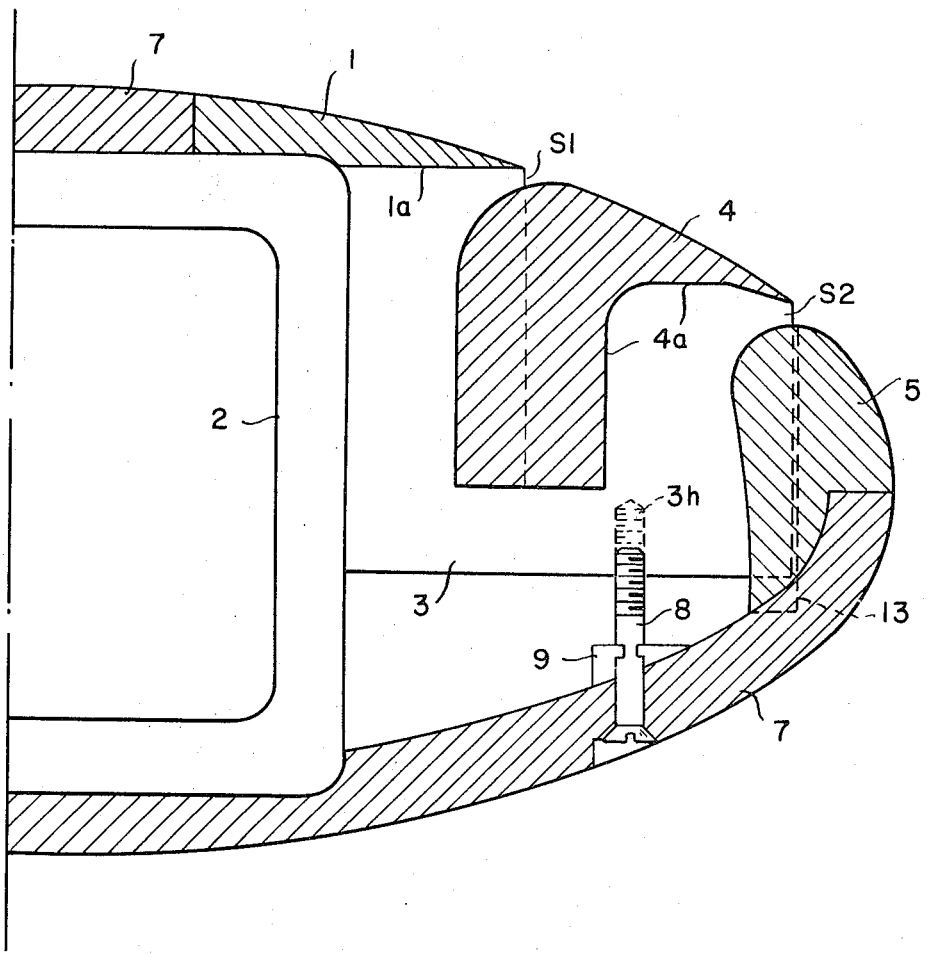
FIG. 5 is a partial cross-section of the multislotted circulation control airfoil and support rib structure including slot height adjustment means for the aft blowing slot.

In the event the aft blowing slot height needs to be adjusted after the final assembly of the airfoil, means may be provided for adjusting either the riding slot blade 4 or the rib 3. As shown in FIG. 5, one method of adjusting the height of aft blowing slot S2 is to provide threaded holes 3h either in the bottom of ribs 3 (as shown) or in the bottom of riding slot blade 4 (not shown). Screw 8 is locked in a vertical position by a suitable fastener 9 and in the lower skin 7 with the screw head accessible from the undersurface of the airfoil exterior. The screw 8 must be long enough to reach the threaded hole but short enough to adjust the blowing slot S2 as far as is required without hitting the end of the threaded hole 3h in pieces 3 or 4. The ribs 3 would in this embodiment be attached to the lower skin 7 by the adjusting screw. Tightening of screw 8 will cause trailing edge 7 and coanda surface 5 to slide vertically upwards along rib 3 which is set within the groove 13 provided in 7 and 5 to decrease the height of blowing slot S2. Similarly, loosening of screw 8 will cause trailing edge 5 and coanda surface 5 to slide vertically downwards along rib 3 within groove 13 to increase the height of blowing slot S2.

Figure 6:
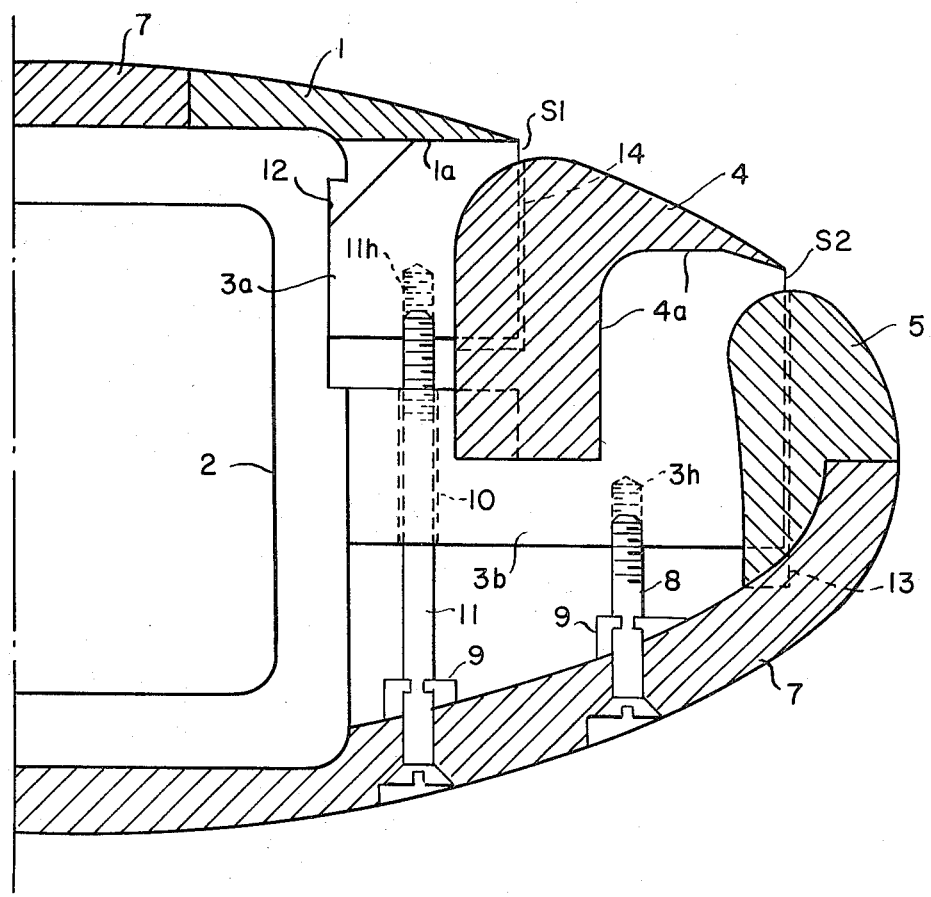
FIG. 6 is a partial cross-section of the multislotted circulation control airfoil and support rib structure including slot height adjustment means for both the aft and forward blowing slots.

A mechanism similar to the mechanism described in FIG. 5 may be used to adjust the blowing slot height of the upper blowing slot S1. FIG. 6 shows the screw 11 being held in place in the lower skin 7 by the fastener 9. The rib is split into two pieces. Rib 3a is attached to the upper slot blade 1 and slides vertically in the groove 12 in the spar and in the groove 14 in the riding slot blade 4. The screw 11 is threaded into the hole 11h. It passes through a clearance hole 10 in the rib 3b. When 11 is turned, it has no effect on blowing slot S2 and moves the knife edge of upper slot blade 1 vertically to adjust blowing slot S1.

Any materials which provide structural integrity and geometric maintenance can be used. Three or more slots may be formed by nesting two or more riding slot blades 4 on the same rib structure. The rib structure would simply have to be fitted for the additional riding slot blades. In the event that circulation control blowing is required at the leading edge of the airfoil, it is clear that the structure disclosed herein could be used simply by inversion thereof. Obviously, many modifications and variations of the present invention are possible in the light of the above teachings. It is, therefore, to be understood that within the scope of the appended claims the invention may be practiced otherwise than as specifically described.

What is claimed is:

1. A multislotted circulation control airfoil comprising:
   a main spar for supporting the multislotted circulation control airfoil;
   a first slot blade attached substantially immovably to said main spar;
   a support rib attached to said main spar;
   a second slot blade attached substantially immovably to said support rib;
   a sliding support rib attached to said first slot blade and positioned within a groove in said main spar and a groove in said second slot blade;
   a blunt trailing edge including a coanda surface
   said first slot blade and said second blade forming a first blowing slot; and
   said second slot blade and said trailing edge forming a second blowing slot.

2. The circulation control airfoil of claim 1 further including first adjustment means for adjusting the slot height of said second blowing slot.

3. The circulation control airfoil of claim 2 further including second adjustment means for adjusting the slot height of said first blowing slot.

4. The circulation control airfoil of claim 2 further including adjustment means for adjusting the position of said sliding support rib and thereby the slot height of said first blowing slot.

* * * * *